United States Patent
Smith

(10) Patent No.: US 10,435,088 B2
(45) Date of Patent: Oct. 8, 2019

(54) TAILGATE REINFORCEMENT

(71) Applicant: Lund Motion Products, Inc., Buford, GA (US)

(72) Inventor: Anthony Smith, Huntington Beach, CA (US)

(73) Assignee: Lund Motion Products, Inc., Buford, GA (US)

(*) Notice: Subject to any disclaimer, the term of this patent is extended or adjusted under 35 U.S.C. 154(b) by 0 days.

(21) Appl. No.: 16/265,048

(22) Filed: Feb. 1, 2019

(65) Prior Publication Data

US 2019/0270487 A1 Sep. 5, 2019

Related U.S. Application Data

(63) Continuation of application No. 15/619,227, filed on Jun. 9, 2017, now Pat. No. 10,227,097.

(60) Provisional application No. 62/354,590, filed on Jun. 24, 2016.

(51) Int. Cl.
| | |
|---|---|
| *B62D 43/02* | (2006.01) |
| *B62D 33/03* | (2006.01) |
| *B60J 5/00* | (2006.01) |
| *B62D 33/027* | (2006.01) |
| *B62D 65/16* | (2006.01) |
| *B62D 33/023* | (2006.01) |
| *B60J 5/04* | (2006.01) |

(52) U.S. Cl.
CPC .......... *B62D 43/02* (2013.01); *B62D 33/023* (2013.01); *B62D 33/0273* (2013.01); *B62D 65/16* (2013.01); *B60J 5/0431* (2013.01); *B62D 33/03* (2013.01); *E05Y 2900/546* (2013.01)

(58) Field of Classification Search
CPC .. B62D 43/02; B62D 33/0273; B62D 33/023; B62D 33/03; B62D 5/0431; B62D 65/16; B60J 5/0431; E05Y 2900/546
USPC ....................................................... 296/146.6
See application file for complete search history.

(56) References Cited

U.S. PATENT DOCUMENTS

| | | |
|---|---|---|
| 2,805,807 A | 9/1957 | Slack |
| 4,140,255 A | 2/1979 | Weiler |
| 4,743,062 A | 5/1988 | McLaren et al. |
| 5,947,540 A | 9/1999 | Pariseau et al. |
| 6,135,537 A | 10/2000 | Giddons |
| 8,251,265 B2 | 8/2012 | Grudek |
| 8,272,653 B2 | 9/2012 | Falkner et al. |
| D698,224 S | 1/2014 | Ridges |
| D730,794 S | 6/2015 | Ridges |
| D758,829 S | 6/2016 | Bennett |
| D818,343 S | 5/2018 | Ignarra |
| 10,227,097 B2 | 3/2019 | Smith |
| 2017/0369108 A1 | 12/2017 | Smith |
| 2018/0118283 A1 | 5/2018 | Gutierrez |

* cited by examiner

FOREIGN PATENT DOCUMENTS

| | | | |
|---|---|---|---|
| DE | 29 46 449 A1 | 5/1981 | |
| WO | WO-2011125172 A1 * | 10/2011 | ............. B62D 43/02 |

*Primary Examiner* — Justin M Larson
(74) *Attorney, Agent, or Firm* — Knobbe, Martens, Olson & Bear LLP

(57) ABSTRACT

Disclosed herein are embodiments of a reinforcement or brace that can be installed on the tailgate of a vehicle. The reinforcement can provide structural support for heavier mounted objects, such as tires, as well as allowing for different attachment points. Advantageously, the tailgate hinge does not need to be removed or replaced.

20 Claims, 9 Drawing Sheets

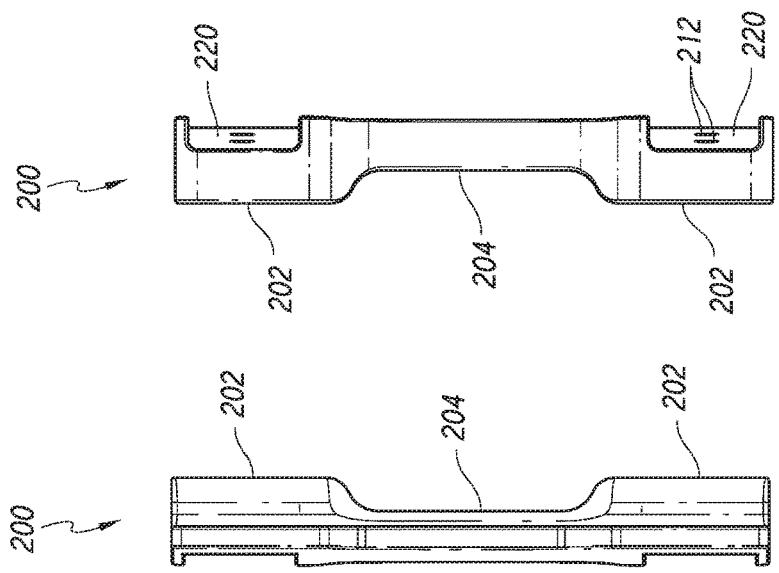
FIG. 8
FIG. 7
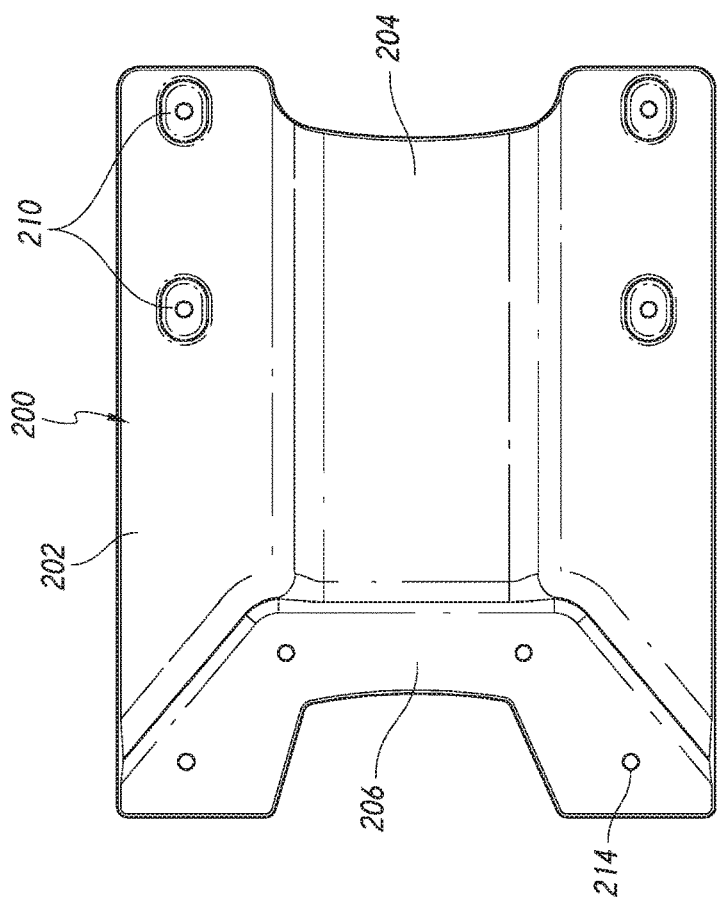
FIG. 6

TAILGATE REINFORCEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Certain embodiments disclosed herein relate generally to reinforcements for use on vehicle tailgates, such as for reinforcing spare tire carriers. Embodiments of the disclosure can reinforce the sheet metal on the tailgate, thereby preventing damage to the tailgate.

Description of the Related Art

For some vehicles, the tailgate can be a structural weak spot. While the hinges connected the tailgate to the body of the vehicle tend to be strong, the material making the tailgate itself, typically a sheet metal, can be easily damaged when swinging the tailgate opened or closed. This can be especially problematic when heavy objects, such as spare tires, are installed on the tailgate. Essentially, the tailgate picks up too much momentum while closing, which can cause damage or flexing of the tailgate when stopped against the vehicle in the closed position. Further, this heavy swinging motion may also enact some damaging torque on the hinges.

Previous reinforcement structures have been used on tailgates, such as shown in U.S. Design Pat. No. D698,224, hereby incorporated by reference in its entirety. However, these types of structures require the full removal of the tailgate hinge, typically both on the tailgate side and the vehicle body side, and a full replacement of the hinge. One aspect of the disclosure is the recognition that this is an expensive and difficult process, in particular the alignment of hinges after removal of the original hinge as tolerances need to be very tight.

SUMMARY

Disclosed herein are embodiments of a spare tire carrier reinforcement for a vehicle tailgate, the reinforcement comprising a reinforcement recessed portion configured to cover a portion of an existing hinge on a tailgate, wherein the existing hinge is configured to at least partially fit within a recess on an inner surface of the reinforcement recessed portion of the spare tire carrier reinforcement, and an attachment member that attaches the reinforcement recessed portion of the spare tire carrier reinforcement to the vehicle tailgate. In some embodiments, the existing hinge can be sandwiched between the reinforcement recessed portion and the tailgate.

In some embodiments, the reinforcement can further comprise a pair of existing hinges and a pair of reinforcement recessed portions, each of the pair of reinforcement recessed portions configured to cover at least half of an existing hinge of the pair of existing hinges, the spare tire carrier reinforcement further comprising a reinforcement bridging portion that connects the pair of reinforcement recessed portions. In some embodiments, the spare tire carrier reinforcement may not extend outside a perimeter of the tailgate. In some embodiments, the reinforcement recessed portion is configured to cover at least half of the existing hinge on the tailgate.

In some embodiments, the reinforcement can further comprise a reinforcement carrier portion configured to fit within a recess of the vehicle tailgate. In some embodiments, the reinforcement can further comprise a spare tire carrier configured to attach to an outer surface of the reinforcement carrier portion of the spare tire carrier reinforcement on a first side of the spare tire carrier. In some embodiments, the reinforcement can further comprise a spacer, wherein the spare tire carrier is configured to attach to an outer surface of the spacer on a second side of the spare tire carrier.

In some embodiments, the reinforcement recessed portions can extend further from the tailgate than the reinforcement bridging portion. In some embodiments, the reinforcement bridging portion can leave a gap between an inside surface of the reinforcement bridging portion and the tailgate. In some embodiments, the spare tire carrier reinforcement can be configured to be directly attached to the existing hinge by inserting at bolt through the spare tire carrier reinforcement, into an existing aperture in the existing hinge, and into the vehicle tailgate. In some embodiments, the spare tire carrier reinforcement can reduce torsion on the existing pair of hinges.

In some embodiments, the reinforcement can further comprise tabs or holes on an outer surface of the spare tire carrier reinforcement.

In some embodiments, the existing hinge can be configured to contact at least one surface of the reinforcement recessed portion.

Also disclosed herein are embodiments of a method of installing a spare tire carrier reinforcement onto a tailgate of a vehicle, the method comprising removing bolts attaching at least one tailgate hinge to the tailgate from at least one aperture in the at least one tailgate hinge and tailgate, covering a portion of the existing tailgate hinge with the spare tire carrier reinforcement, wherein the at least one tailgate hinge fits within a recess in the spare tire carrier reinforcement, and inserting bolts through apertures in the spare tire carrier reinforcement and into the aperture in the at least one tailgate hinge and the tailgate.

In some embodiments, the method can further comprise removing a spare tire carrier from the tailgate, and after inserting the bolts, attaching the spare tire carrier to an outer surface of the spare tire carrier reinforcement. In some embodiments, the method can further comprise attaching at least one spacer to the tailgate after the removing of the spare tire carrier, and attaching the spare tire carrier to an outer surface of the at least one spacer.

In some embodiments, the at least one tailgate hinge may not be removed during installation of the spare tire carrier reinforcement.

BRIEF DESCRIPTION OF THE DRAWINGS

FIGS. 6-10 illustrate different view of an embodiment of a tailgate reinforcement.

DETAILED DESCRIPTION

Figure 1:
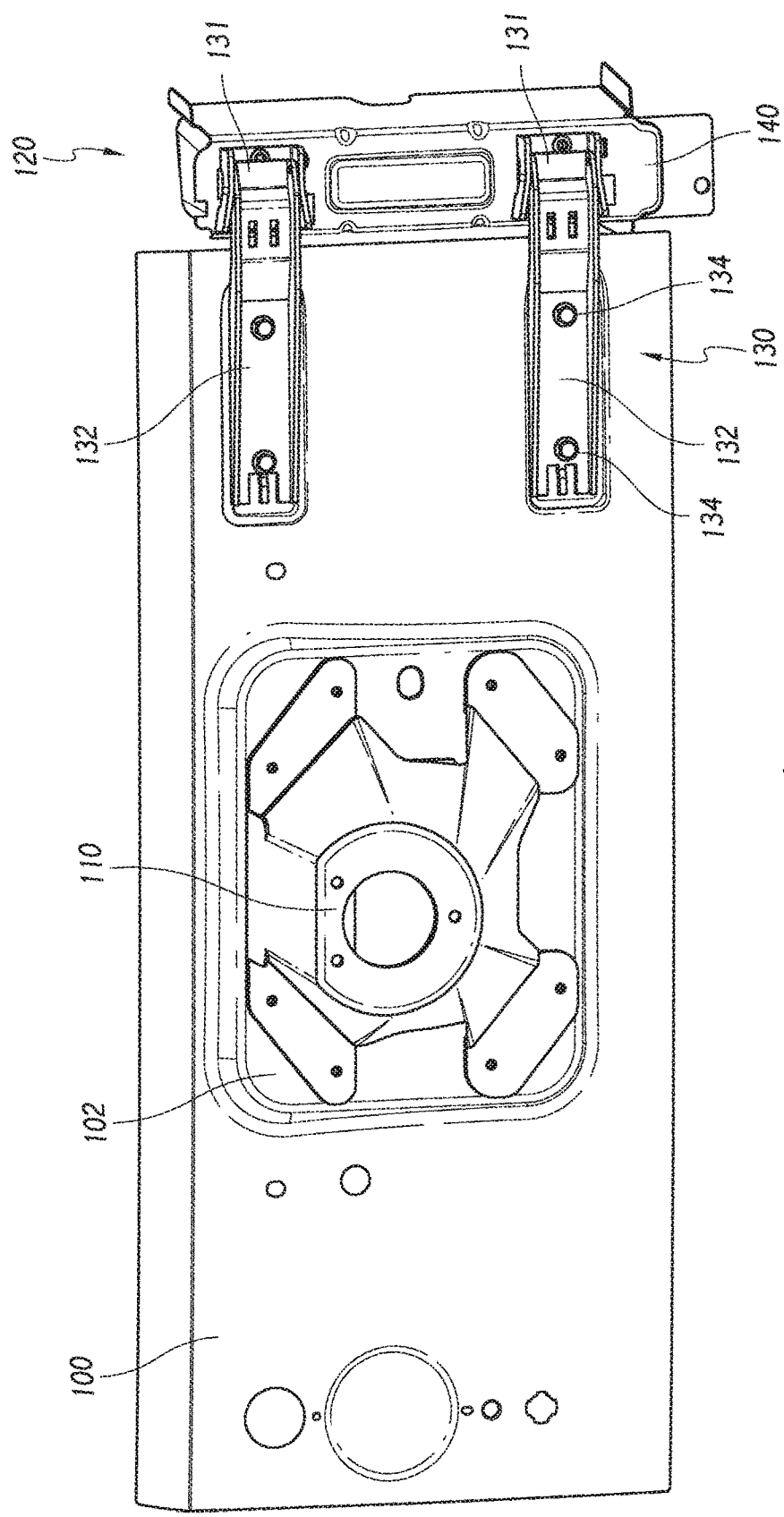
FIG. 1 illustrates a tailgate with a spare tire mount and hinge.

Disclosed herein are embodiments of a tailgate reinforcement (e.g., spare tire carrier tailgate reinforcement, tailgate brace, or reinforcement) which can be used to strengthen a vehicle tailgate and prevent damage to the tailgate. The tailgate reinforcement can advantageously help support heavier objects on the tailgate of a vehicle, such as a truck, Jeep, etc., though the particular vehicle does not limit the disclosure. Heavier tires that are used on the vehicles, especially when located farther away from the hinge, can cause damage to the tailgate during motion. In particular, swinging the tailgate shut can lead to a substantial amount of momentum being directed back at the vehicle, which can lead to damage to the body of the vehicle itself or the tailgate. Advantageously, embodiments of the tailgate reinforcement can minimize damage to the tailgate, as well as reduce torque to hinges connecting the tailgate to the vehicle body. For example, the tailgate reinforcement can transfer the strength of the hinges along the reinforcement to protect the tailgate from damage.

In some embodiments, the reinforcement can be nested on top of an existing tailgate hinge and connected to the existing tailgate hinge, thus eliminating the need to remove the hinge. Thus, advantageously the existing hinges need not be removed and replaced as opposed to other reinforcements that have been developed, such as discussed above. Accordingly, there can be significant costs and time savings for the installation of embodiments of the disclosure as compared to those currently known in the art. Further, the installation of embodiments of the disclosure would be easier, especially to a layperson, than those known in the art.

The reinforcement can be made of a number of different materials, such as aluminum, steel, other metals/alloys, polymers, plastics, or ceramics, and the particular material does not limit the disclosure. Further, the exact dimensions of the reinforcement do not limit the disclosure and can vary depending on the structure of the vehicle and/or the existing hinges.

Spare Tire Carrier Tailgate Reinforcement

In the generalist form, embodiments of the reinforcement can include two bodies connected by a bridging section with the two bodies at least partially covering previously installed hinges on the tailgate. However, more or less hinges may be used in some embodiments, and thus there can be multiple bridging sections between three or more bodies covering the hinges. In some embodiments, the hinges can be nested within recesses/depressions within the reinforcement, rather than just being generally covered by the reinforcement. This can help strengthen the tailgate to prevent bending or breaking of the tailgate, and generally reduce the force load on the tailgate itself. For example, the reinforcement can advantageously extend the mass of the hinges out and away from the sheet metal forming the back surface of the tailgate. Further, the bridging section can be configured to lock the existing hinges together, which can reduce or prevent misalignment of the hinges, such as due to torsion on the hinges.

FIG. 1 illustrates an embodiment of a standard tailgate assembly for a vehicle. As shown, the tailgate 100 (this view showing the sheet metal forming a front face of the tailgate facing outwards from the back of the vehicle in the closed position) can include a spare tire carrier 110, typically located in a depression/recess/well 102 of the tailgate 100, as well as a hinge 120. The hinge 120 can be made up of a body section 140 and a tailgate section 130 with the hinging mechanism located between and attaching the two and located generally to the side of each of the components 120/130.

The tailgate section 130 of the hinge 120 can include a pair of arms 132 located generally parallel to one another and extending partially along a width of the tailgate 100. However, other configurations of the hinge 120 can be used as well which can be encompassed by embodiments of the reinforcement discussed herein. As shown, bolts 134 can be used to attach the arms 132 to the tailgate 100.

Figure 2:
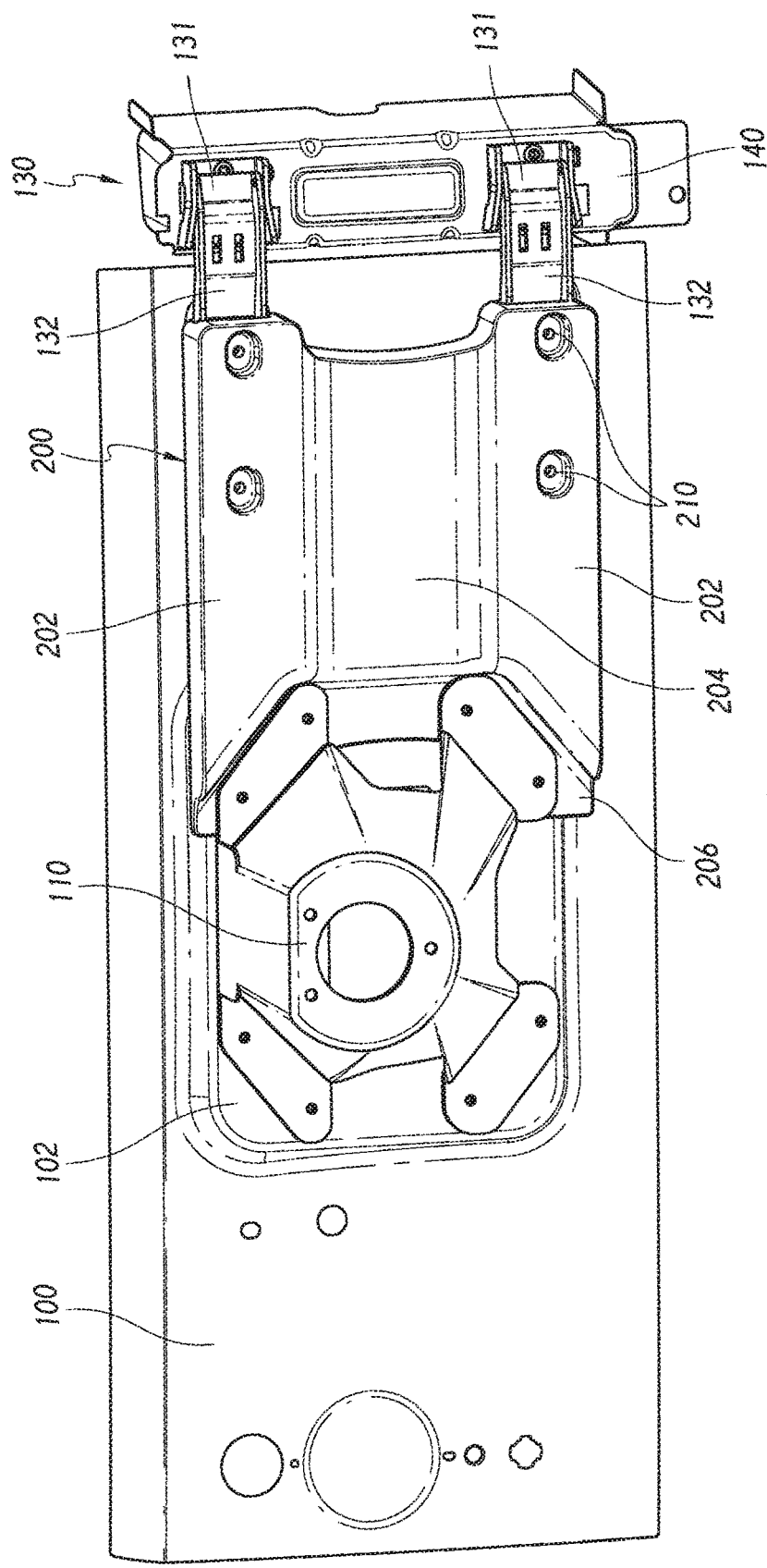
FIG. 2 illustrates a tailgate including an embodiment of a tailgate reinforcement.

FIG. 2 illustrates the same tailgate assembly as FIG. 1 but including an embodiment of a tailgate reinforcement 200. As shown, the tailgate reinforcement 200 partially covers the rear surface of the tailgate 100. In some embodiments, the reinforcement 200 does not extend outside the perimeter of the tailgate 100, such as shown in FIG. 2, and thus does not cover the hinging mechanism. In some embodiments, the reinforcement 200 extends outside of a perimeter of the tailgate 100.

As shown, the reinforcement 200 extends generally from the hinging mechanism 131, while not covering the hinging section 131 which would prevent motion, and extends along a width of the tailgate 100. While FIG. 2 shows the reinforcement 200 extending about halfway the width of the tailgate 100, the particular width of the reinforcement 200 does not limit the disclosure. Thus, the reinforcement 200 could extend ¼, ½, ¾ or fully across a width of the tailgate 100. In some embodiments, the reinforcement 200 could extend less than ¼, ½, ¾ or fully across a width of the tailgate 100. the reinforcement 200 could extend more than ¼, ½, or ¾ across a width of the tailgate 100.

In some embodiments, the tailgate reinforcement 200 can cover all or substantially all of the arms 132, though the particular coverage does not limit the disclosure. In some embodiments, the tailgate reinforcement 200 can generally conform to an outer surface of the tailgate 100 (such as well 102) and the arms 132 of the hinge 120. In some embodiments, the tailgate reinforcement 200 may not change dimensions to conform to an outer surface of the tailgate 100.

As shown in FIG. 2, the tailgate reinforcement 200 can be generally formed from two reinforcement hinge bracing sections 202 connected by a reinforcement bridging (or connecting) section 204. The reinforcement hinge bracing sections 202 are configured to at least partially cover the arms 132 of the hinge 130. As discussed below, the reinforcement hinge bracing sections 202 can be recessed so that the arms 132 fit within the reinforcement hinge bracing sections 202, thus providing structural support to the hinge 130. In some embodiments, the reinforcement hinge bracing sections 202 may straddle the arms 132. The reinforcement hinge bracing sections 202 can vary in dimensions as they extend away from the hinge 130, for example becoming narrower towards their distal end as shown in FIG. 2. The arms 132 can contact at least one surface within the recess of the reinforcement hinge bracing sections 202.

In some embodiments, the tailgate reinforcement 200 can include a reinforcement recess section 206 to conform with the well 102 of the tailgate 100, though in other embodiments there may be no reinforcement recess section 206 depending on the extension width of the reinforcement 200.

By conforming generally to the well 102 of the tailgate 100, the reinforcement recess section 206 can provide further stability to the tailgate reinforcement 200.

The reinforcement bridging section 204 may extend the length of the reinforcement hinge bracing sections 202 or may be substantially shorter. For example, the reinforcement bridging section 204 may only connect approximately 90%, 80%, 70%, 60%, 50%, 40%, or 30% of the reinforcement hinge bracing sections 202. In some embodiments, the reinforcement bridging section 204 may only connect at less than approximately 90%, 80%, 70%, 60%, 50%, 40%, or 30% of the reinforcement hinge bracing sections 202. In some embodiments, the tailgate reinforcement 200 may form a generally square shape with the reinforcement bridging section 204 extending a length of the reinforcement hinge bracing sections 202. In some embodiments, the tailgate reinforcement 200 may form a generally backwards c-shape with the reinforcement bridging section 204 only extending a partial width of the reinforcement hinge bracing sections 202.

In some embodiments, the reinforcement hinge bracing sections 202 may include wells 210 to retain screws or other attachment mechanisms in aperture 212 (shown in FIG. 5) of the wells 210. Accordingly, the screws 134 of the hinge 120 may be removed and the same screw (or longer screws in some cases) may be inserted into the apertures 212 to connect the tailgate reinforcement 200 directly to the tailgate 100, holding the hinge 120 between the two. Thus, the tailgate reinforcement 200 may have the same number of wells 210 and apertures 212 as screws 134 in the tailgate component 130 of the hinge 120. In some embodiments, the tailgate reinforcement 200 may have more wells 210 and apertures 212 as the screws 134 in the tailgate component 130 of the hinge 120. In some embodiments, the tailgate reinforcement 200 may have less wells 210 and apertures 212 as the screws 134 in the tailgate component 130 of the hinge 120.

In some embodiments, an outer surface of the reinforcement hinge bracing sections 202 may extend further away from an outer surface of the tailgate 100 than an outer surface of the reinforcement bridging section 204. For example, the reinforcement hinge bracing sections 202 may be thicker than the reinforcement bridging section 204 in some embodiments. However, in some embodiments, the reinforcement hinge bracing sections 202 and reinforcement bridging section 204 may be flush on the outward facing surface of the reinforcement 200.

In some embodiments, there may be a gap between an inner surface of the reinforcement bridging section 204 and the outer surface of the tailgate 100. Thus, a user could insert an item, such as a rope, through the gap to wrap around the reinforcement 200. In some embodiments, a user could insert different attachment mechanisms and/or assemblies, such as a mounting assembly or a bracket assembly, into the gap. Other accessories such as, for example, jacks or CB antennas, can then be installed onto the reinforcement 200.

Figure 3:
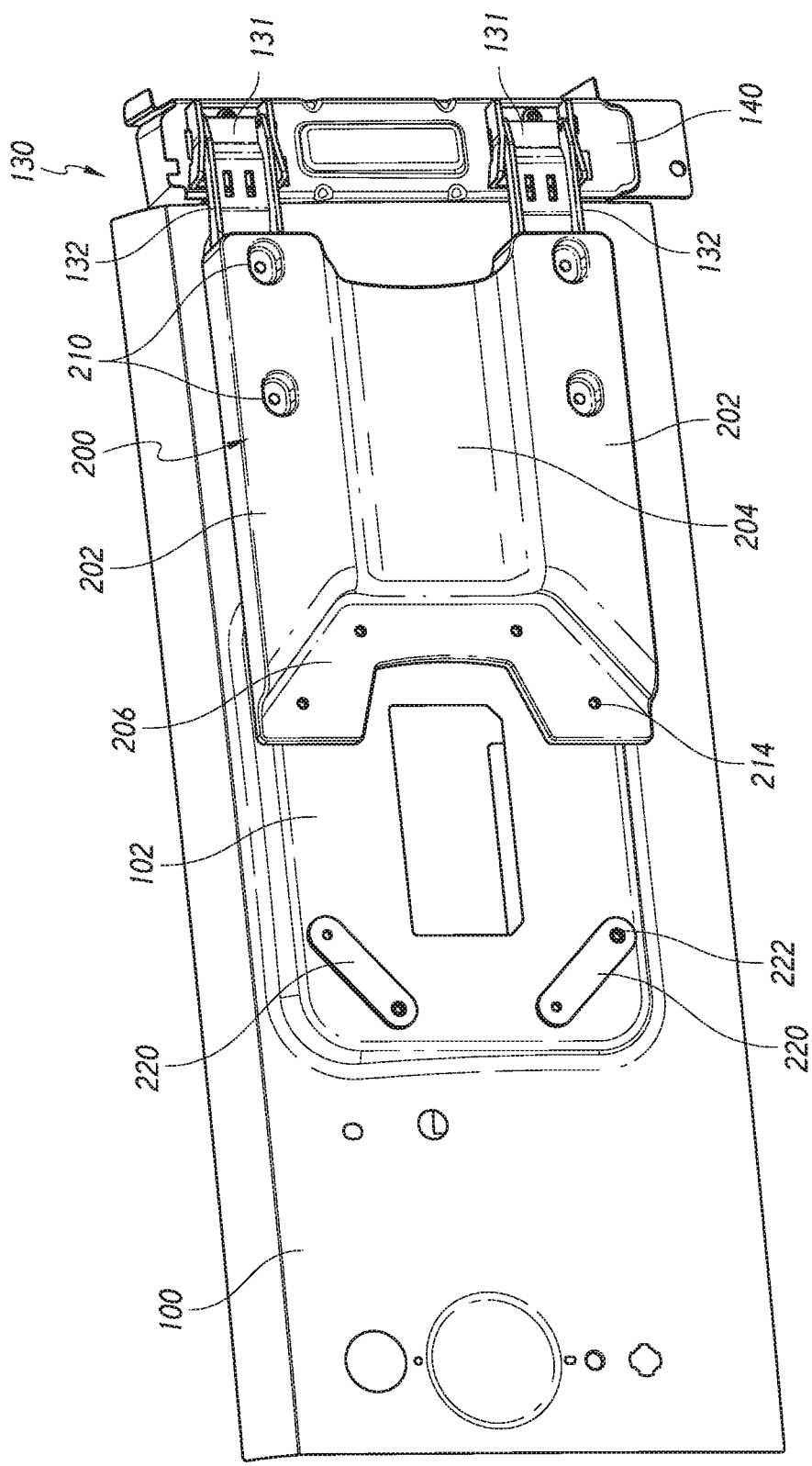
FIG. 3 illustrates the tailgate of FIG. 2 with the spare tire carrier removed.

FIG. 3 illustrates the tailgate 100 with the spare tire carrier 110 removed. As shown, the reinforcement 200 includes a number of apertures 214 in the recess section 206 that can be aligned with apertures in the spare tire carrier 110. Thus, the spare tire carrier 110 can be installed onto the outer surface of the reinforcement 200, such as shown in FIG. 2. However, in some embodiments, the reinforcement 200 can be attached to the tailgate 100 in an area outside of the spare tire carrier 110.

As the reinforcement 200 has a thickness extending away from the tailgate 100, the spare tire carrier 110 may be imbalanced when reinstalled onto the reinforcement 200. Accordingly, spacers 220, such as the two shown in FIG. 3 can be used which have the same thickness as the section of the reinforcement 200 that the spare tire carrier 110 is installed on, allowing the spare tire carrier 110 to be balanced and even on the tailgate 100. While two spacers 220 are shown in FIG. 3, any number of spacers can be used depending on the configuration of the spare tire carrier 110. Further, a single large spacer 220 could be used as well. In some embodiments, the reinforcement 200 may extend so that the entirety of the spare tire carrier 110 is located on it, thus making spacers 220 unnecessary. The spacers 220 can be attached through apertures 222.

Figure 4:
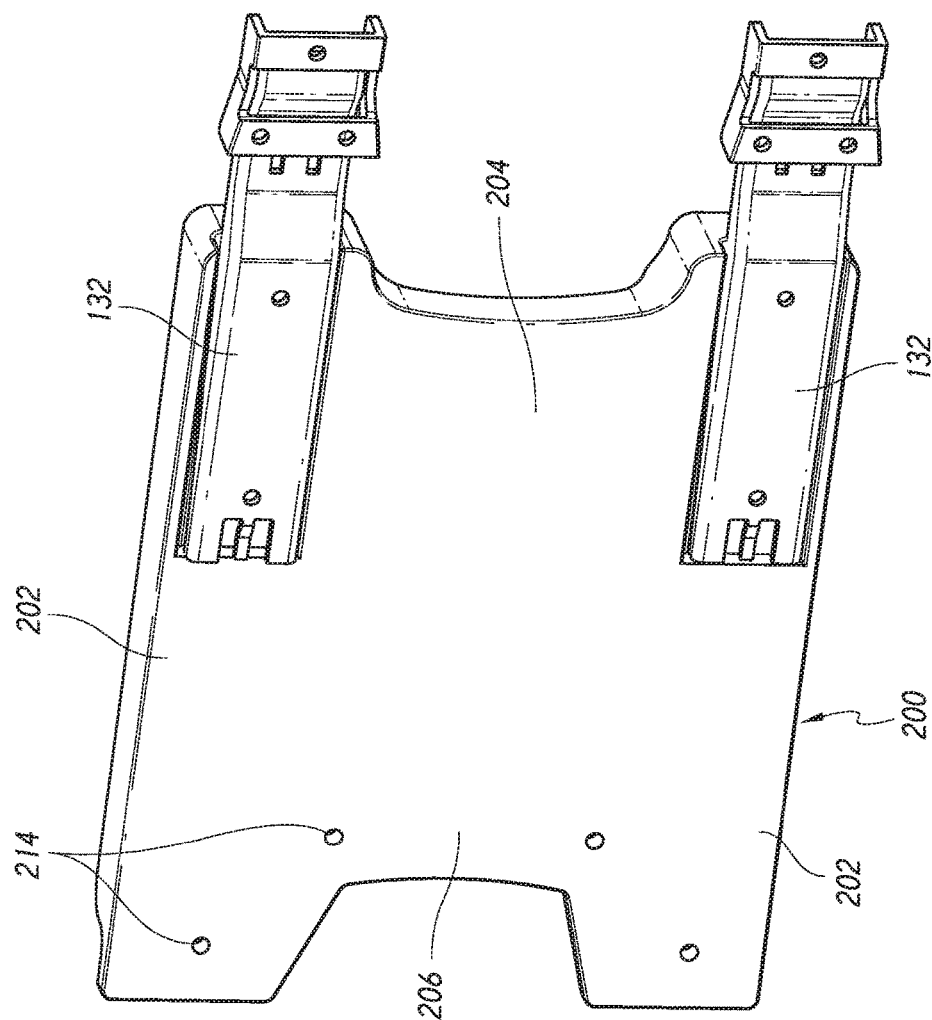
FIG. 4 illustrates a reverse view of an embodiment of a tailgate reinforcement attached to a tailgate hinge.
Figure 5:
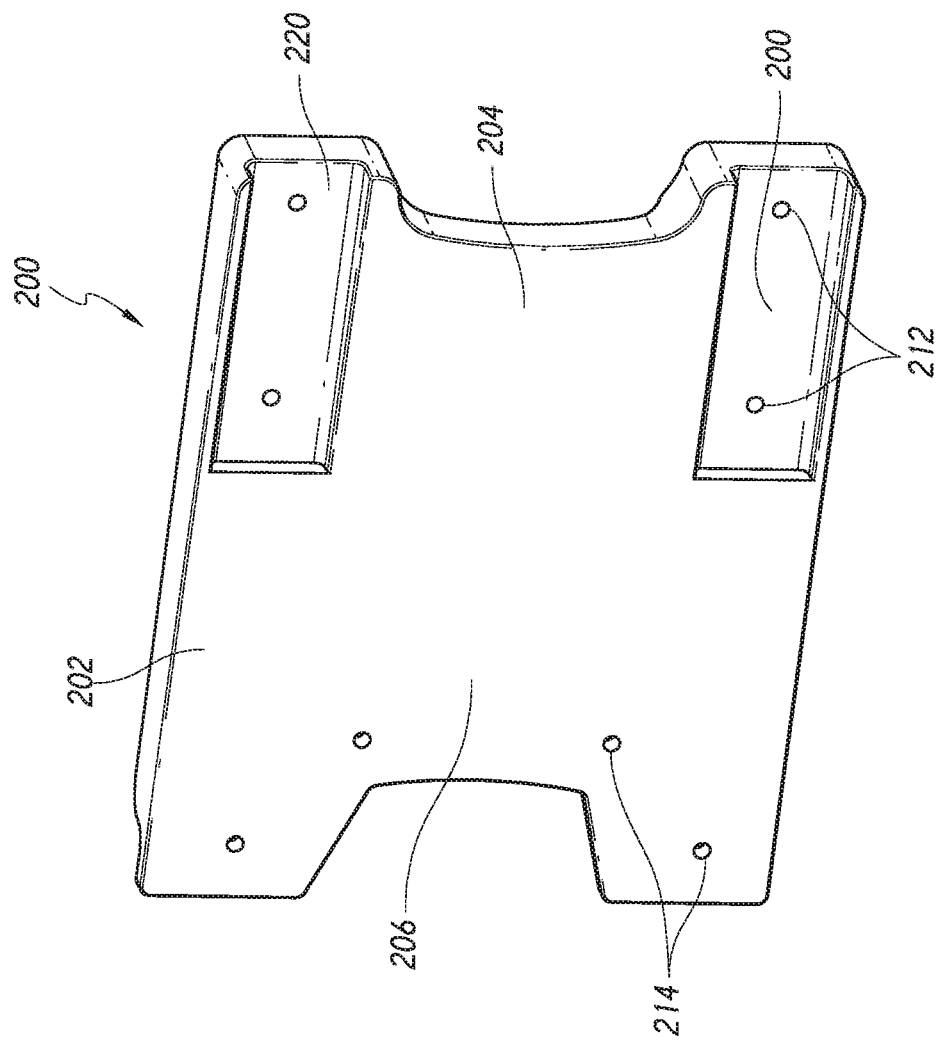
FIG. 5 illustrates a reverse view of an embodiment of a tailgate reinforcement shown in FIG. 4 with the hinges removed.
Figure 9:
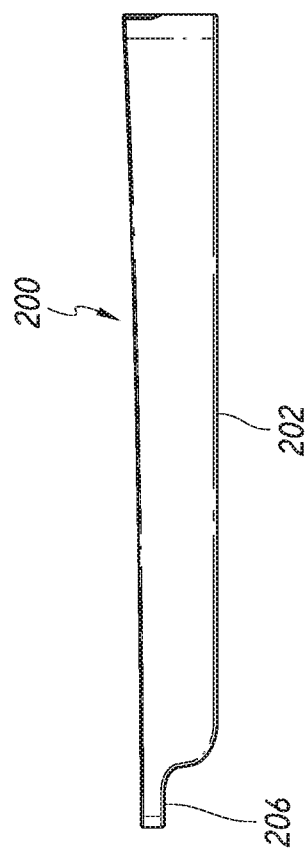
Figure 10:
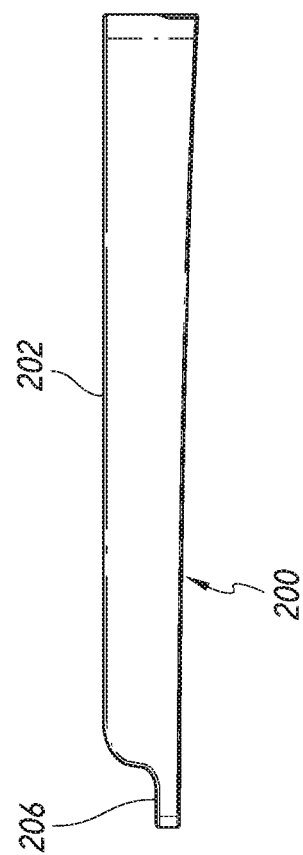

FIGS. 4-5 illustrate a reverse view of the reinforcement 200 (e.g., generally showing an inner surface that would desirably at least partially abut against the tailgate 100. FIG. 4 shows the hinge arms 132 attached to the reinforcement 200, while FIG. 5 shows the reinforcement 200 with the hinge arms 132 removed, thereby showing recesses 220.

As shown, the reinforcement 200 can have recesses 220 that can generally conform to the dimensions of the hinge arms 132. In some embodiments, the recesses 220 can be sized so that there is no gap surrounding the arms 132, which prevents unwanted motion (e.g., wiggle room) of the hinge arms 132 and the reinforcement 200. In some embodiments, the recesses 220 can be positioned to abut certain points on the arms 132, preventing wiggle but does not need to fully conform to the hinge arms 132. Thus, the reinforcement 200 desirably has a point that at least engages an outer surface, upper surface, and lower surface of each hinge arm 132. In some embodiments, the hinge arms 132 contacts at least one surface of the reinforcement 200. This allows the reinforcement 200 and the hinge arms 132 to work as one larger piece, providing additional strength to the tailgate 100. As shown, the aperture 212 can extend into the recesses 220. In some embodiments, the original bolts from the hinge arms 132 can be used to install the reinforcement 200. In some embodiments, longer replacement bolts can be used instead. The bolts can be threaded into the tailgate 100, thereby sandwiching the hinge arms 132 between the reinforcement 200 and the tailgate 100. Thus, the tailgate 100 can act as a nut to hold the reinforcement 200 in place.

FIGS. 6-10 illustrate alternate viewpoints of the reinforcement 200.

Figure 11:
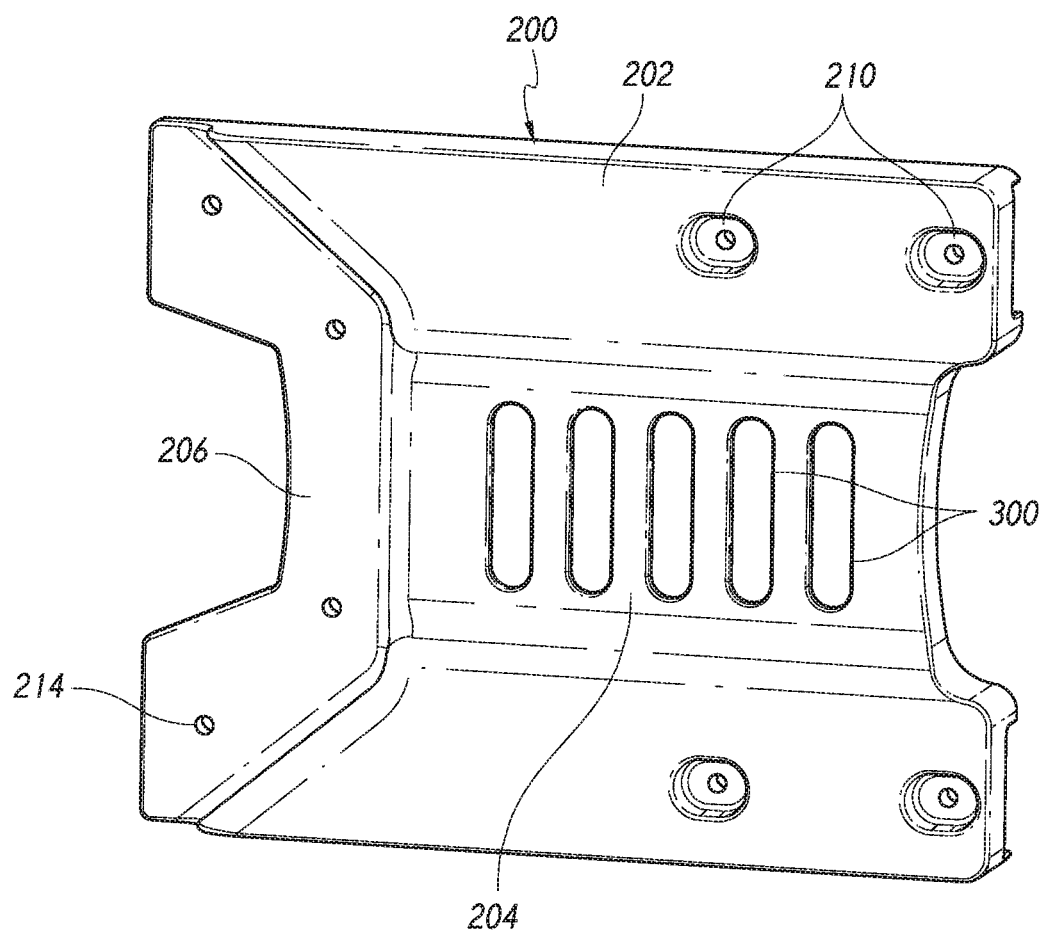
FIG. 11 illustrates an embodiment of a tailgate reinforcement having slots for attachment of different accessories or connectors.

FIG. 11 illustrates an embodiment of the reinforcement 200 having a corrugated pattern 300 formed on the reinforcement bridging section 204. The corrugated pattern 300 can be formed from a plurality of generally vertical slots or indentations, though the particular direction and look of the corrugated pattern 300 does not limit the disclosure, and they can extend diagonal, horizontal, or form other shapes such as a checkerboard pattern or crisscrosses. In some embodiments, the corrugated pattern 300 can be located on both an outer surface and inner surface of the bridging section 204. In some embodiments, the corrugated pattern 300 can be located on only one of the outer surface and inner surface of the bridging section 204.

As discussed above, there can be a gap between the bridging section 204 and the tailgate 100. Thus, a mount (or other connection assembly not shown) can be installed on or around the connection area 204. The mount can be configured to mate with the corrugated pattern 300 (or at least mate with a portion of the corrugated pattern 300). However, in some embodiments the corrugated pattern 300 may be ornamental, and thus enhance the overall aesthetics of the reinforcement 200. In some embodiments, a single mount can be attached. In some embodiments, multiple mounts can be attached. In some embodiments, the mount can be configured to hold a number of different accessories. Further, other tabs, bolt holes/apertures, etc. can be located around the reinforcement 200 for attachment of other accessories. In some embodiments, these holes can be tapped. In some embodiments, plugs can be included into the holes until they are used.

Installation Method

Discussed below are embodiments of an installation method for attaching embodiments of the reinforcement onto the vehicle.

Figure 12:
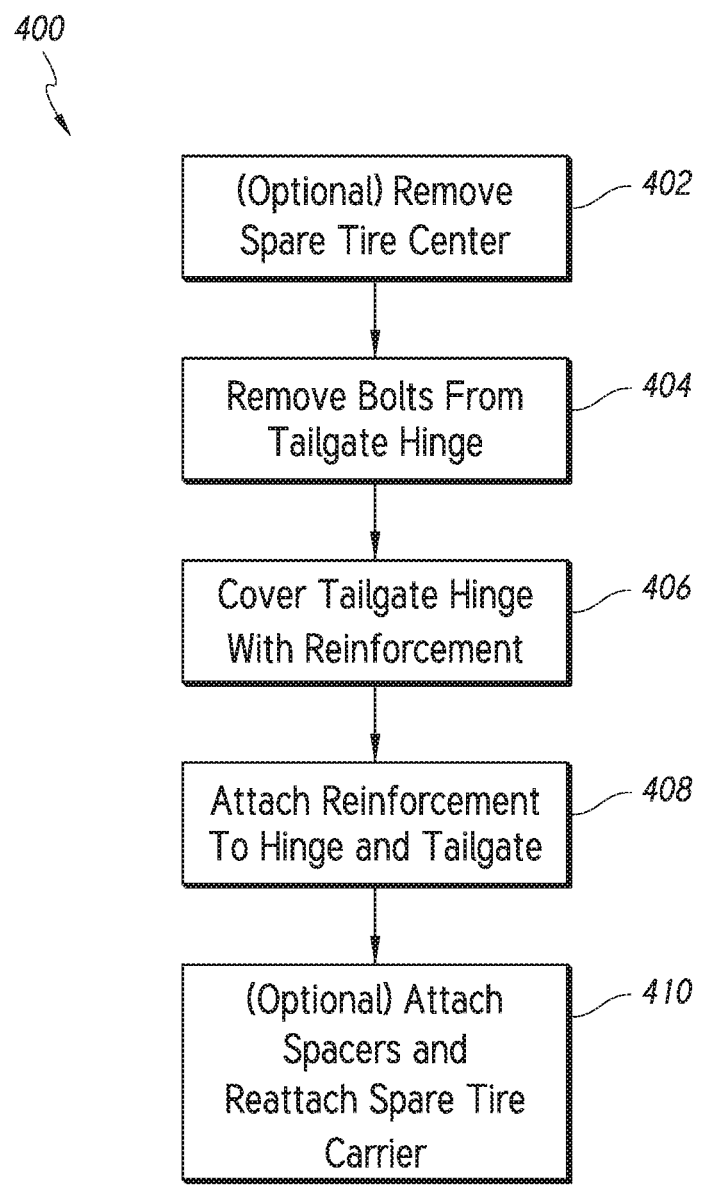
FIG. 12 illustrates a method of installing an embodiment of a tailgate reinforcement.

FIG. 12 illustrates an example embodiment of an installation method 400. If the reinforcement 200 will connect to the spare tire carrier, the spare tire carrier can first be removed 402. If not, the spare tire carrier need not be removed as the reinforcement 200 can be installed around the spare tire carrier. Following, bolts can be removed from the tailgate hinge attached to the tailgate 404, though the hinge itself does not need to be removed. The reinforcement 200 can then cover the tailgate hinge, as discussed above, 406. The reinforcement 200 can then be attached to the tailgate by using bolts through the reinforcement, tailgate hinge, and tailgate 408. The bolts can be the original bolts removed from the tailgate hinge, or longer bolts. If the spare tire carrier is to be attached to the reinforcement 200, spacers 220 can be installed to balance the spare tire carrier and the spare tire carrier can be installed onto the spacers 220 and reinforcement 410.

In some embodiments, the reinforcement 200 can be installed without the need to remove any of the hinges from the tailgate or the vehicle. In some embodiments, the reinforcement 200 can provide significant structural support to the tailgate, thus reducing or preventing damage, cracking, buckling, or other deformation of the tailgate.

From the foregoing description, it will be appreciated that an inventive spare tire carrier reinforcements and installation methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A tailgate reinforcement for a vehicle tailgate, the tailgate reinforcement comprising:
   a first and second hinge bracing section configured to cover at least a portion of an existing hinge on the vehicle tailgate, each of the first and second hinge bracing sections having a width;

a bridging section connecting the first and second hinge bracing sections, the bridging section defining a connection area configured to receive a mount, wherein the connection area of the bridging section comprises a plurality of slots or indentations extending vertically between the first and second hinge bracing sections; and wherein a width of the bridging section is shorter than the widths of the first and second hinge bracing sections.

2. The tailgate reinforcement of claim 1, further comprising a mount installed on the connection area of the bridging section, the mount being configured to hold an accessory.

3. The tailgate reinforcement of claim 1, wherein the bridging section defines an inner surface and an outer surface, the plurality of slots or indentations being located on one or both of the inner surface and the outer surface.

4. The tailgate reinforcement of claim 1, wherein the hinge bracing sections vary in dimension as the hinge bracing sections extend away from the existing hinges when the tailgate reinforcement is attached to the vehicle tailgate.

5. The tailgate reinforcement of claim 4, wherein each of the hinge bracing sections comprise a distal end and a proximal end, the hinge bracing sections narrowing towards the distal ends.

6. The tailgate reinforcement of claim 1, wherein the bridging section locks the existing hinges together when the tailgate reinforcement is attached to the vehicle tailgate.

7. The tailgate reinforcement of claim 1, wherein the tailgate reinforcement does not extend outside of a perimeter of the vehicle tailgate.

8. The tailgate reinforcement of claim 1, wherein the tailgate reinforcement extends outside of a perimeter of the vehicle tailgate.

9. The tailgate reinforcement of claim 1, wherein the tailgate reinforcement extends across about half of a width of the vehicle tailgate.

10. The tailgate reinforcement of claim 1, further comprising a recess section configured to conform with a well of the vehicle tailgate.

11. A tailgate reinforcement for a vehicle tailgate, the tailgate reinforcement comprising:
a first and second hinge bracing section configured to cover at least a portion of an existing hinge on the vehicle tailgate, each of the first and second hinge bracing sections having a width;
a bridging section connecting the first and second hinge bracing sections, the bridging section defining a series of openings or recesses;
wherein a width of the bridging section is shorter than the widths of the first and second hinge bracing sections such that the tailgate reinforcement forms a generally backwards c-shape.

12. The tailgate reinforcement of claim 11, further comprising a mount attached to the openings or recesses of the bridging section, the mount being configured to hold an accessory.

13. The tailgate reinforcement of claim 11, wherein the bridging section defines an inner surface and an outer surface, the series of openings or recesses being located on one or both of the inner surface and the outer surface.

14. The tailgate reinforcement of claim 11, wherein the hinge bracing sections vary in dimension as the hinge bracing sections extend away from the existing hinges when the tailgate reinforcement is attached to the vehicle tailgate.

15. The tailgate reinforcement of claim 14, wherein each of the hinge bracing sections comprise a distal end and a proximal end, the hinge bracing sections narrowing towards the distal ends.

16. The tailgate reinforcement of claim 11, wherein the bridging section locks the existing hinges together when the tailgate reinforcement is attached to the vehicle tailgate.

17. The tailgate reinforcement of claim 11, wherein the tailgate reinforcement does not extend outside of a perimeter of the vehicle tailgate.

18. The tailgate reinforcement of claim 11, wherein the tailgate reinforcement extends outside of a perimeter of the vehicle tailgate.

19. The tailgate reinforcement of claim 11, wherein the tailgate reinforcement extends across about half of a width of the vehicle tailgate.

20. The tailgate reinforcement of claim 11, further comprising a recess section configured to conform with a well of the vehicle tailgate.

* * * * *